United States Patent [19]
Eckert

[11] Patent Number: 6,073,729
[45] Date of Patent: Jun. 13, 2000

[54] METHOD OF OPERATING A HYDRAULIC BRAKE SYSTEM

[75] Inventor: Alfred Eckert, Bodenheim, Germany

[73] Assignee: ITT Manufacturing Enterprises, Inc., Wilmington, Del.

[21] Appl. No.: 09/051,513

[22] PCT Filed: Oct. 9, 1996

[86] PCT No.: PCT/EP96/04368

§ 371 Date: Jun. 15, 1998

§ 102(e) Date: Jun. 15, 1998

[87] PCT Pub. No.: WO97/16334

PCT Pub. Date: May 9, 1997

[30] Foreign Application Priority Data

Oct. 27, 1995 [DE] Germany .......................... 195 39 973

[51] Int. Cl.[7] ........................................................ F16D 66/00
[52] U.S. Cl. .................................... 188/1.11; 303/3; 303/15
[58] Field of Search .................................. 303/114.3, 155, 303/3, 10, 11, 15, 166; 188/1.11

[56] References Cited

U.S. PATENT DOCUMENTS

| | | | |
|---|---|---|---|
| 4,512,615 | 4/1985 | Kita et al. ................................. | 303/97 |
| 4,859,003 | 8/1989 | Ostwald ................................... | 303/111 |
| 5,445,442 | 8/1995 | Barth et al. .............................. | 303/141 |
| 5,752,748 | 5/1998 | Schramm et al. ....................... | 303/20 |
| 5,778,337 | 8/1998 | Eckert ..................................... | 303/3 |
| 5,816,667 | 10/1998 | Jokic ..................................... | 303/113.4 |
| 5,820,229 | 10/1998 | Pueschel ................................ | 303/139 |

FOREIGN PATENT DOCUMENTS

| | | |
|---|---|---|
| 0379329 | 7/1990 | European Pat. Off. . |
| 4028290 | 1/1992 | Germany . |
| 4208496 | 8/1993 | Germany . |
| 4329140 | 12/1994 | Germany . |
| 4324205 | 1/1995 | Germany . |
| 4420061 | 12/1995 | Germany . |
| 93/24353 | 12/1993 | WIPO . |

*Primary Examiner*—Robert J. Oberleitner
*Assistant Examiner*—Melanie Talavera
*Attorney, Agent, or Firm*—Rader, Fishman & Grauer PLLC

[57] ABSTRACT

The present invention relates to a method of operating a hydraulic brake system for automotive vehicles, which includes an anti-lock system (ABS), a brake force booster which is electrically actuatable independently of the driver's wish, and a pressure or deceleration controller which is used to actuate the brake force booster.

In order to enhance the quality of ABS control in particular, according to the present invention, a signal (ABSM) indicative of the ABS mode is sent to the pressure or deceleration controller (12) and, upon commencement of ABS control, the instantaneous pressure or deceleration actual value ($Pi_{ist1}$, $P_{ist11}$, $P_{ist12}$) is stored and the brake force booster (2) is actuated so that the pressure or deceleration actual value ($P_{ist}$) is maintained constant.

12 Claims, 2 Drawing Sheets

METHOD OF OPERATING A HYDRAULIC BRAKE SYSTEM

BACKGROUND OF THE INVENTION

The present invention relates to a method of operating a hydraulic brake system for automotive vehicles, which includes an anti-lock system (ABS), a brake force booster which is electrically actuatable independently of the driver's wish, and a pressure or deceleration controller which is used to actuate the brake force booster and to which a pressure or deceleration nominal value signal generated by a superior controller and an actual value signal representative of the hydraulic pressure that prevails in the system or the occurring deceleration are sent as input quantities.

The article "Electronically Controlled Brake Force Booster" published in the Automobile Technology Journal ATZ 97 describes a hydraulic brake system for automotive vehicles wherein there is no exchange of quantities characterizing the ABS control condition (apart from the information about the preset nominal pressure and the wheel speeds) between the electronic ABS controller and the pressure or deceleration controller which actuates the electrically actuatable brake force booster. This causes uncomfortable movements of the brake force booster and noises during ABS control operations which are triggered by the independent activation of the brake force booster. Further, inappropriate ABS control cycles which involve longer stopping distances may occur which are due to pressure variations in the ABS control operations which the pressure controller, in interaction with the electronically controllable brake force booster, tends to compensate by control.

Therefore, an object of the present invention is to virtually eliminate the above mentioned shortcomings and to thereby enhance the quality of the ABS control.

SUMMARY OF THE INVENTION

According to the present invention, this object is achieved because a signal indicative of the ABS control mode is sent to the pressure or deceleration controller, and the instantaneous pressure or deceleration actual value is stored upon commencement of the ABS control and the brake force booster is actuated so that the pressure or deceleration actual value is maintained constant.

Further details, features and advantages of the present invention can be taken from the following description of an embodiment, making reference to the accompanying drawings.

BRIEF DESCRIPTION OF THE INVENTION

DETAILED DESCRIPTION OF THE INVENTION

Figure 1:
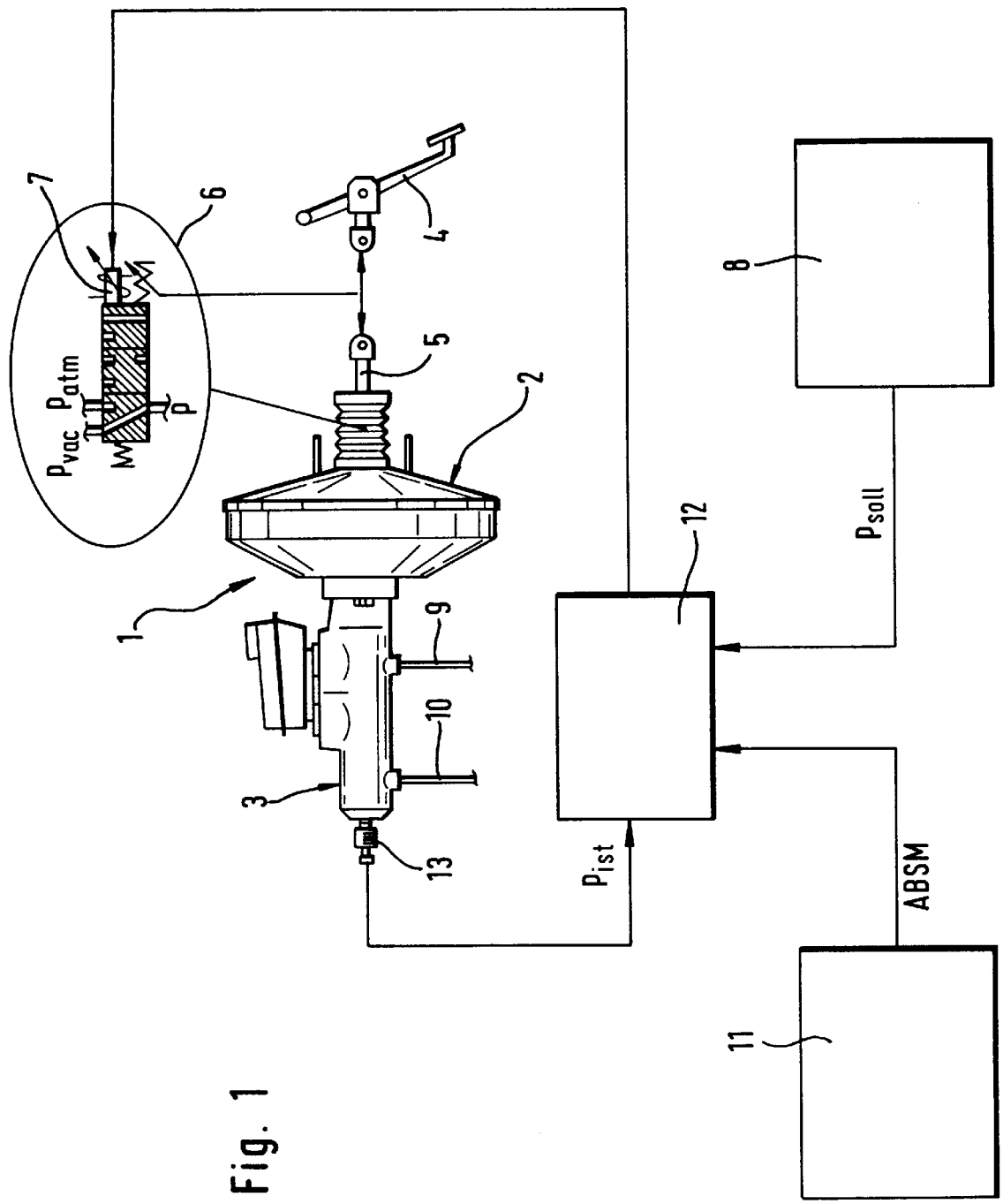
FIG. 1 is a greatly simplified view of a hydraulic brake system for implementing the method of the present invention.

The brake system for automotive vehicles shown in FIG. 1 generally includes an actuating unit 1, an electronic controller 8, an anti-lock system including an electronic ABS controller 11 and wheel brakes (not shown). The actuating unit 1, in turn, has a pneumatic brake force booster, preferably a vacuum brake force booster 2, operable by an actuating pedal 4. Connected downstream of booster 2 is a master brake cylinder 3, preferably a tandem master cylinder 3, having pressure chambers (not shown) which are connected to the wheel brakes by way of hydraulic lines 9, 10. Coupled to the actuating pedal 4 is an actuating rod 5 which is used to mechanically actuate a control valve 6 (illustrated only schematically). Control valve 6 controls the increase and decrease of a pneumatic differential pressure in the housing of the vacuum brake force booster 2. A solenoid 7 permits (independently) activating the control valve 6 irrespective of the actuating rod 5. The solenoid 7 is actuated by actuating signals of an electronic brake pressure controller 12 to which are sent, as input quantities, a signal ABSM produced by the ABS controller 11, a pressure nominal value signal $P_{soll}$ produced by the controller 8, and a pressure actual value signal $P_{ist}$ produced by a pressure sensor 13 which senses the hydraulic pressure that prevails in the system. The signal ABSM contains the information about the ABS control condition, i.e., about whether an ABS control operation is instantaneously being carried out, or whether the ABS control is inactive.

Figure 2A:
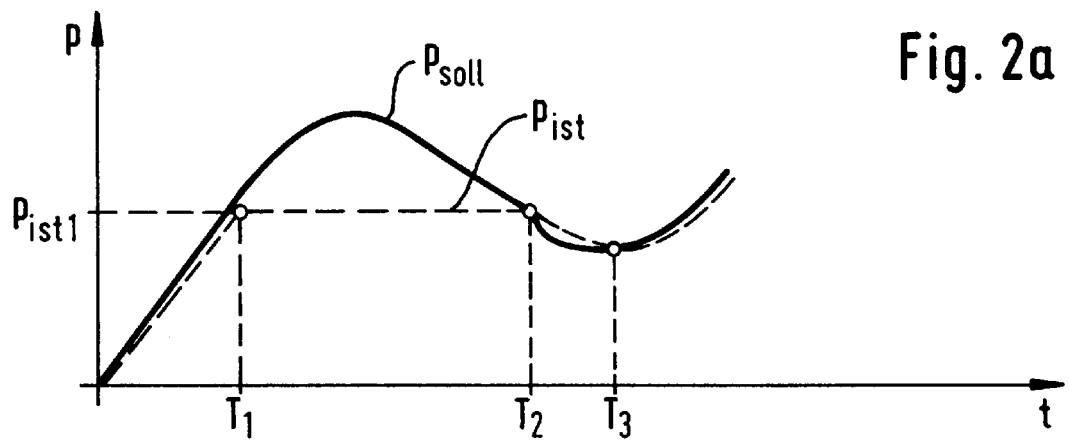
FIGS. 2a to 2c are diagrams showing the pressure variations in the implementation of the method of the present invention in various control situations.

FIGS. 2a, b, and c are diagrams showing the signal variations $P_{soll}$ and $P_{ist}$ plotted against time t in various control situations.

FIG. 2a shows pressure control with a constant coefficient of friction $\mu$ between the road surface and the wheel. It is assumed that the ABS controller 11 produces a signal ABSM at time $T_1$, i.e., that an ABS control operation commences at time $T_1$. The instantaneous pressure actual value $P_{ist1}$, which corresponds to this time is stored. Subsequently, the actual pressure $P_{ist}$ is maintained constant by the pressure controller 12 until time $T_2$ when the pressure nominal value $P_{soll}$ corresponds to the pressure actual value $P_{ist}$. When the pressure nominal value $P_{soll}$ is below the pressure actual value $P_{ist}$, the pressure actual value $P_{ist}$ will be reduced by the pressure controller 12 according to the predetermined nominal value course until the time $T_3$ when the ABS control operation is deactivated by the ABS controller 11. Commencing time $T_3$, the pressure actual value $P_{ist}$ introduced by the pressure controller 12 will follow the preset pressure value $P_{soll}$.

Figure 2B:
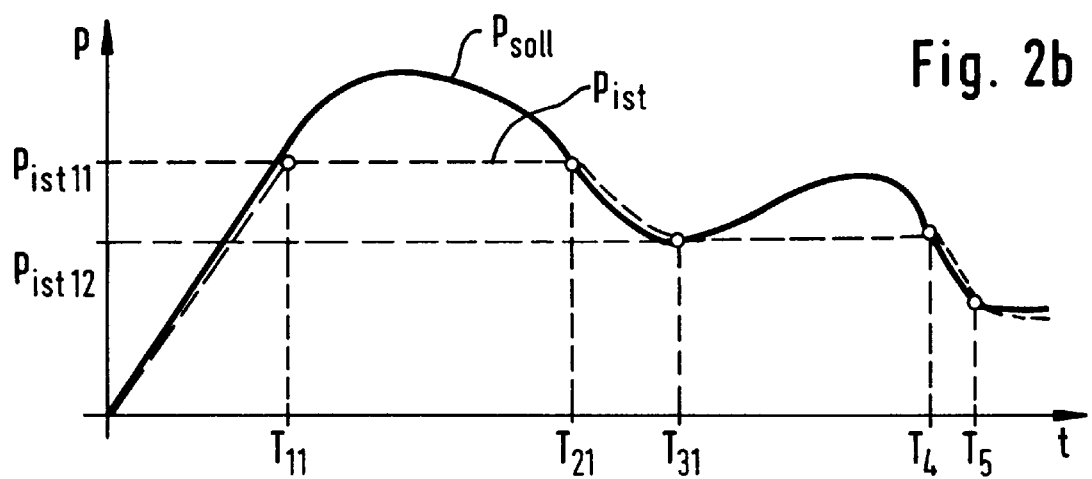

The ABS control remains active until time $T_5$. in the control shown in FIG. 2b. At the commencement of the ABS control at time $T_{11}$, the pressure actual value $P_{ist11}$ corresponding to this time is stored. Subsequently, the actual pressure $P_{ist}$ is maintained constant by the pressure controller 12 until the time $T_{21}$ when the pressure nominal value $P_{soll}$ corresponds to the pressure actual value $P_{ist11}$.

The control is performed at a high coefficient of friction $\mu$ between the road surface and the wheel in the interval $T_{11}$ to $T_{21}$. The coefficient of friction changes from 'high-$\mu$' to 'low-$\mu$' at time $T_{21}$ so that the actual pressure $P_{ist}$ introduced by the pressure controller 12 follows the preset pressure value $P_{soll}$ until at time $T_{31}$ the pressure actual value $P_{ist12}$ corresponding to this time is stored and replaces the above mentioned first pressure actual value $P_{istll}$. Thus, the actual pressure $P_{ist}$ introduced by the pressure controller 12 is maintained constant on this value until time $T_4$. Subsequently, the pressure will follow the preset pressure value $P_{soll}$ in the interval $T_4$ to $T_5$ until the ABS control is deactivated at time $T_5$.

Figure 2C:
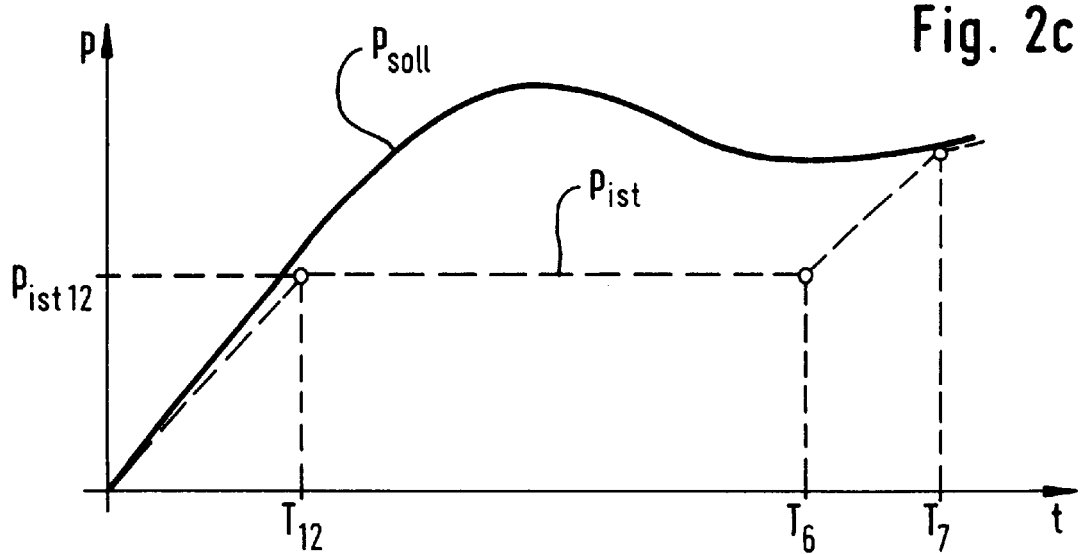

In the control illustrated in FIG. 2c, which initially occurs at a low coefficient of friction 'low-$\mu$', the pressure actual value $P_{ist12}$ determined at time $T_{12}$ upon the commencement of ABS control is stored, and the actual pressure $P_{ist}$ introduced by the pressure controller 12 is maintained constant on this value in the interval $T_{12}$ to $T_6$. At time $T_6$, when a 'μ-change' from 'low-μ' to 'high-μ' occurs, the ABS control is disconnected, and the brake controller 12 attempts to adjust the preset value $P_{soll}$ in the interval $T_6$ to $T_7$. The pressure is increased in the interval $T_6$ to $T_7$ preferably with a predetermined pressure gradient which must not be exceeded.

It can be seen in the above description that only pressure-maintaining and pressure-reducing phases are permitted during active ABS control. Further, it is appropriate to coarsely filter (for example, in a $PT_1$ element) the pressure actual values determined at the beginning of the ABS control.

What is claimed is:

1. Method of operating a hydraulic brake system for automotive vehicles, which includes an anti-lock brake system, a brake force booster which is electrically actuatable independently of the driver's wish, and pressure controller which is used to actuate the brake force booster and to which a signal corresponding to a nominal value of a braking effect generated by an anti-lock brake system controller and a signal corresponding to an actual value of a braking effect are sent as input quantities, wherein a signal indicative of an ABS control mode is sent to the pressure controller and, upon commencement of ABS control, the instantaneous actual value is stored and the brake force booster is actuated so that the actual value is maintained constant wherein the signal corresponding to the nominal value and the signal corresponding to the actual value are representative of a hydraulic pressure prevailing in the brake system.

2. Method as claimed in claim 1, wherein the signal corresponding to the nominal value and the signal corresponding to the actual value are representative of a vehicle deceleration.

3. Method as claimed in claim 1, wherein when the nominal value is reduced below the actual value, the brake force booster is actuated by the pressure controller to the effect of adjusting a reduced actual value which is stored and maintained constant.

4. Method as claimed in claim 1, wherein, upon de-activation of an ABS control, the brake force booster is actuated by the pressure controller to the effect of adapting the actual value to the predetermined nominal value.

5. Method as claimed in claim 4, wherein a defined pressure or deceleration gradient is not exceeded until the predetermined nominal value is reached.

6. Method as claimed in claim 1, wherein the actual value is filtered in a PT1 element before it is stored.

7. Method of operating a hydraulic brake system for automotive vehicles, which includes an anti-lock brake system, a brake force booster which is electrically actuatable independently of the driver's wish, and pressure controller which is used to actuate the brake force booster and to which a signal corresponding to a nominal value of a braking effect generated by an anti-lock brake system controller and a signal corresponding to an actual value of a braking effect are sent as input quantities, wherein a signal indicative of an ABS control mode is sent to the pressure controller and, upon commencement of ABS control, the instantaneous actual value is stored and the brake force booster is actuated so that the actual value is maintained constant wherein, upon de-activation of an ABS control, the brake force booster is actuated by the pressure controller to the effect of adapting the actual value to the predetermined nominal value.

8. Method as claimed in claim 7, wherein the signal corresponding to the nominal value and the signal corresponding to the actual value are representative of a hydraulic pressure prevailing in the brake system.

9. Method as claimed in claim 7, wherein the signal corresponding to the nominal value and the signal corresponding to the actual value are representative of a vehicle deceleration.

10. Method as claimed in claim 7, wherein when the nominal value is reduced below the actual value, the brake force booster is actuated by the pressure controller to the effect of adjusting a reduced actual value which is stored and maintained constant.

11. Method as claimed in claim 7, wherein a defined pressure or deceleration gradient is not exceeded until the predetermined nominal value is reached.

12. Method as claimed in claim 7, wherein the actual value is filtered in a PT1 element before it is stored.

* * * * *